United States Patent
Chu et al.

(10) Patent No.: US 10,021,524 B2
(45) Date of Patent: Jul. 10, 2018

(54) DISPLAYING LOCATION-BASED IMAGES THAT MATCH THE WEATHER CONDITIONS

(71) Applicant: OATH INC., New Yok, NY (US)

(72) Inventors: Sing Yun Chu, Sunnyvale, CA (US); Marco Wirasinghe, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/187,069

(22) Filed: Jun. 20, 2016

(65) Prior Publication Data

US 2016/0309299 A1    Oct. 20, 2016

Related U.S. Application Data

(63) Continuation of application No. 13/964,499, filed on Aug. 12, 2013, now Pat. No. 9,386,432.

(51) Int. Cl.
| | |
|---|---|
| H04W 4/02 | (2009.01) |
| H04W 4/20 | (2018.01) |
| G06F 3/0485 | (2013.01) |
| G06F 17/30 | (2006.01) |

(52) U.S. Cl.
CPC .......... *H04W 4/025* (2013.01); *G06F 3/0485* (2013.01); *G06F 17/30277* (2013.01); *H04W 4/20* (2013.01)

(58) Field of Classification Search
None
See application file for complete search history.

(56) References Cited

U.S. PATENT DOCUMENTS

| | | | | |
|---|---|---|---|---|
| 6,961,061 | B1* | 11/2005 | Johnson | G06T 15/503 345/473 |
| 7,275,089 | B1* | 9/2007 | Marshall | G01W 1/00 702/2 |
| 7,417,672 | B2* | 8/2008 | Nakajima | G03B 17/24 348/207.99 |
| 8,509,804 | B2* | 8/2013 | Lewis | H04M 3/42093 379/201.01 |

(Continued)

OTHER PUBLICATIONS

Project Weather: Group Pool Discussion; http:www.flickr.com/groups/projectweather/dated Jun. 11.2-13 (2 pages).

(Continued)

*Primary Examiner* — Hilina K Demeter
(74) *Attorney, Agent, or Firm* — James J. DeCarlo; Greenberg Traurig, LLP

(57) ABSTRACT

An image associated with a location and depicting the current weather conditions at the location is served to the user along with the current weather data of the location. If an image for the location that aptly depicts the weather conditions as indicated by the weather data cannot be identified, the geographical area associated with the location is expanded to search for appropriate images from an expanded image pool. The expansion can continue in one or more steps until a threshold is reached beyond which the geographical area my no longer be expanded. If no images are retrieved upon reaching the threshold, an image reflecting the weather condition is selected from a fallback image set for presentation with the weather data.

20 Claims, 13 Drawing Sheets

(56) References Cited

U.S. PATENT DOCUMENTS

| | | | | |
|---|---|---|---|---|
| 8,538,459 B2* | 9/2013 | Choi | ................. | H04M 1/72566 455/412.1 |
| 2004/0266458 A1* | 12/2004 | Kataoka | ............ | H04M 1/72563 455/456.5 |
| 2005/0136983 A1* | 6/2005 | Agapi | .................... | H04L 29/06 455/566 |
| 2006/0035628 A1* | 2/2006 | Miller | .................. | H04M 3/493 455/414.3 |
| 2006/0229810 A1* | 10/2006 | Cross | .................... | G01C 21/20 701/469 |
| 2006/0241865 A1* | 10/2006 | Smith | .................... | G08B 21/10 702/3 |
| 2006/0267783 A1* | 11/2006 | Smith | ..................... | G01W 1/00 340/601 |
| 2007/0208513 A1* | 9/2007 | Hillman | ................. | G01W 1/00 702/3 |
| 2008/0065329 A1* | 3/2008 | Wilcox | ................... | G01W 1/00 702/3 |
| 2008/0113656 A1* | 5/2008 | Lee | ....................... | H04L 67/325 455/414.3 |
| 2008/0188210 A1* | 8/2008 | Choi | .................... | G04G 9/0076 455/414.3 |
| 2009/0005071 A1* | 1/2009 | Forstall | ................ | G06F 3/0481 455/456.1 |
| 2009/0186604 A1* | 7/2009 | Ruy | ....................... | G06Q 10/10 455/414.3 |
| 2009/0316671 A1* | 12/2009 | Rolf | ....................... | H04W 4/02 370/338 |
| 2010/0130184 A1* | 5/2010 | Fan | ......................... | H04W 4/02 455/414.3 |
| 2011/0074624 A1* | 3/2011 | Bunch | ..................... | G01S 7/003 342/26 D |
| 2011/0076992 A1* | 3/2011 | Chou | .................... | G06Q 10/00 455/414.1 |
| 2013/0109361 A1* | 5/2013 | Felt | ......................... | H04W 4/02 455/414.1 |
| 2013/0339345 A1* | 12/2013 | Soto Matamala | .. | G06F 17/3089 707/722 |
| 2014/0002277 A1* | 1/2014 | Fulger | ................ | G01C 21/3415 340/905 |
| 2014/0018106 A1* | 1/2014 | Fulger | ................ | G01C 21/3415 455/456.3 |

OTHER PUBLICATIONS

Wirasinghe; The Forecast is Beautiful: Introducing the Yahoo! Weather App for iPhone, iPod and Ipod Touch; http://blog.flickr.net/en/2013/04/18/the-forecast-is-beautiful Apr. 18, 2013; 3 pages.

The weather, made beautiful; http://blog.flickr.net/en/2013/04/18/the-weather-made-beautiful Apr. 18, 2013; 3 pages.

WeatherBug: WeatherBug 3.0 iPhone App Packs Lightning Alerts, Neighborhood-Level Conditions, and Better Local Forecasts from the World's Largest Real-Time Weather Network, Apr. 13, 2013.

WeatherBug: WeatherBug Backyard Community Photos, White Christmas in Milliken Colorado, Dec. 25, 2012.

WeatherBug: WeatherBug for Android Launches video (May 1, 2013).

\* cited by examiner

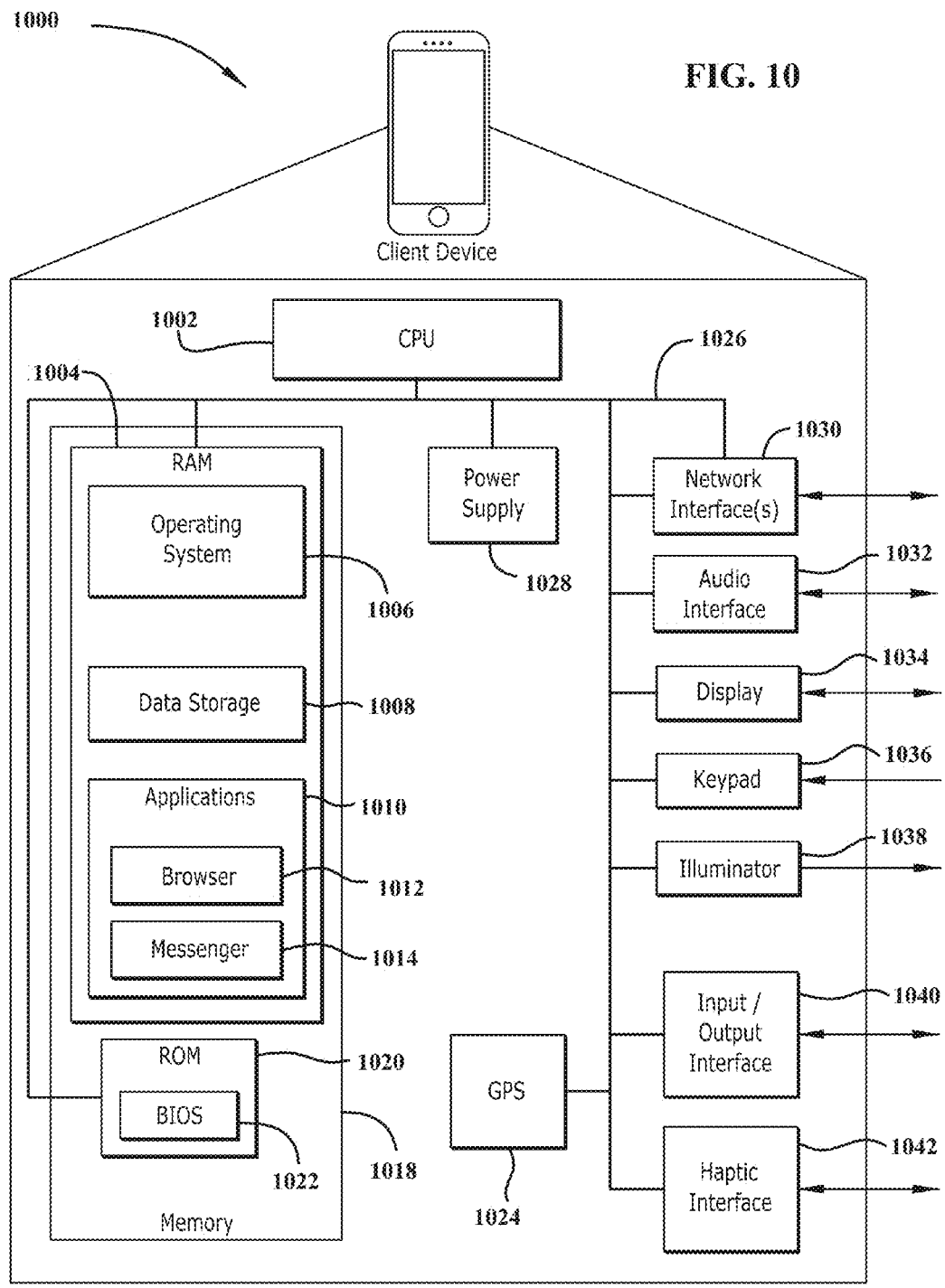

DISPLAYING LOCATION-BASED IMAGES THAT MATCH THE WEATHER CONDITIONS

CROSS REFERENCE TO RELATED APPLICATIONS

This application is a continuation of, and claims priority from co-pending U.S. patent application Ser. No. 13/964,499, filed on Aug. 12, 2013, entitled "Displaying Location-Based Images That Match The Weather Conditions," which is incorporated herein by reference.

BACKGROUND

Computing devices are commonly employed by users to execute various tasks via the communication networks such as exchange of email, transmission of audio/image/video data, or to search for information. The emergence of mobile networks with capacities to transport different types of data in addition to voice data has led to the proliferation of mobile devices such as smartphones and tablet devices. Such mobile devices are not only used for voice communication but are also extensively employed by users for accessing a variety of data including image, audio and video data. Weather data, such as, current weather conditions or predicted weather conditions is one type of information that is routinely accessed users via the computing devices for planning trips, meetings or other outdoor activities.

SUMMARY

This disclosure relates to systems and methods for serving weather data with images depicting the weather conditions at users' locations. A method for serving weather data with appropriate images is disclosed in an embodiment. The method steps are executed by a processor via logic stored in a non-transitory processor readable storage medium. The method comprises, receiving, by a processor, a request for weather information from a user device, the request is associated with location information. In an embodiment, the location information can comprise GPS (Global Positioning System) data associated with a user device. In an embodiment, the location information can comprise unique ids associated with each of the user selected locations. Upon receiving the request, the processor retrieves weather data indicative of current weather conditions at at least one locale identified by the location information. The processor also identifies an image associated with the locale from an image collection wherein, the image depicting the weather conditions that match the retrieved weather data. The metadata of the identified image is received, combined with the weather data and transmitted for presentation to a user. In an embodiment, the user device can retrieve the identified image from the metadata, combine the image with the weather data for display to the user.

In one embodiment, if no images associated with the locale that depict weather conditions matching the retrieved weather data are identified, the processor expands a geographical area associated with the locale to include additional area surrounding the locale thereby accessing an expanded image collection depicting various weather conditions corresponding to the expanded area in order to select an appropriate image for presentation with the weather data. The expanding and accessing steps are repeated until at least one image from the expanded image collection depicting weather conditions that match the retrieved weather data is selected/identified or a threshold condition is met. In one embodiment, the threshold condition comprises a predetermined limit beyond which the geographical area associated with the locale cannot be further expanded. In an embodiment, the image for combining with the weather data is identified from a default image collection when the threshold condition is met wherein the default image collection comprises images depicting generic themes such that the exact locations where the images were taken cannot be identified from the images.

In an embodiment, images submitted by users for including in the image collection are received by the processor which determines if each of the user-submitted images satisfies a policy. Based on the determination, the user-submitted images that satisfy the policy are added to the image collection.

In an embodiment, a plurality of images associated with the locale and depicting weather conditions that match the retrieved weather data are retrieved by the processor from the image collection. The retrieved images are ranked by the processor, in a descending order such that a first ranked image best depicts the weather conditions and the first ranked image is selected for combining with the weather data. In an embodiment the best image for combining with the weather data is received via a user input.

A computing device comprising a processor and a storage medium for tangibly storing thereon program logic for execution by the processor is disclosed in an embodiment. The programming logic comprises request receiving logic for receiving a request for weather information from a user device, wherein the request associated with location information, weather data retrieving logic, for retrieving weather data indicative of current weather conditions at a locale identified by the location information and image identifying logic for identifying an image associated with the locale from an image collection, wherein the image depicts weather conditions that match the retrieved weather data. The processor further executes image metadata receiving logic, for receiving metadata of the identified image to be combined with the weather data for presentation to a user and transmitting logic for transmitting the image metadata combined with the weather data for presentation to the user device.

In an embodiment, if no images associated with the locale that depict weather conditions matching the retrieved weather data are identified, the processor executes expanding logic, for expanding a geographical area associated with the locale and accessing logic for accessing an expanded image collection depicting various weather conditions corresponding to the expanded area associated with the locale. In an embodiment, the processor also executes repeating logic, for repeating execution of the expanding logic and the accessing logic until at least one image from the expanded image collection depicting weather conditions that match the retrieved weather data is selected or a threshold condition is met. In an embodiment, the threshold condition comprises a predetermined limit beyond which the geographical area associated with the locale cannot be further expanded. In an embodiment, the processor executes default image selecting logic for selecting the image for combining with the weather data from a default image collection when the threshold condition is met. The default image collection comprises images depicting generic themes such that locations where images of the default collection were taken cannot be identified.

A computer readable storage medium comprising processor-executable instructions is disclosed in an embodiment. The instructions cause the processor to receive a request for weather information from a user device, the request associated with location information, retrieve weather data indicative of current weather conditions for at least one locale identified by the location information, and identify an image associated with the locale from an image collection, the image depicting weather conditions that match the retrieved weather data. The instructions also cause the processor to transmit the received metadata with the weather data to the user device. In an embodiment, the user device can retrieve the identified image from the metadata, combined the image with the weather data for display to the user.

In an embodiment, if no images associated with the locale that depict weather conditions matching the retrieved weather data are received, the instructions cause the processor to expand a geographical area associated with the locale, access an expanded image collection depicting various weather conditions corresponding to the expanded area associated with the locale and repeat execution of the expansion and the accessing steps until at least one image from the expanded image collection depicting weather conditions that match the retrieved weather data is selected or a threshold condition is met wherein the threshold condition comprises a predetermined limit beyond which the geographical area associated with the locale cannot be further expanded. In one embodiment the computer readable medium further comprises instructions that cause the processor to select the image for combining with the weather data from a default image collection when the threshold condition is met. In an embodiment the instructions also cause the processor to determine if each of the user-submitted images satisfies a policy and add user-submitted images that satisfy the policy to the image collection.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 10 is a schematic diagram illustrating a client device implementation of a computing device in accordance with embodiments of the present disclosure.

DESCRIPTION OF EMBODIMENTS

Figure 1:
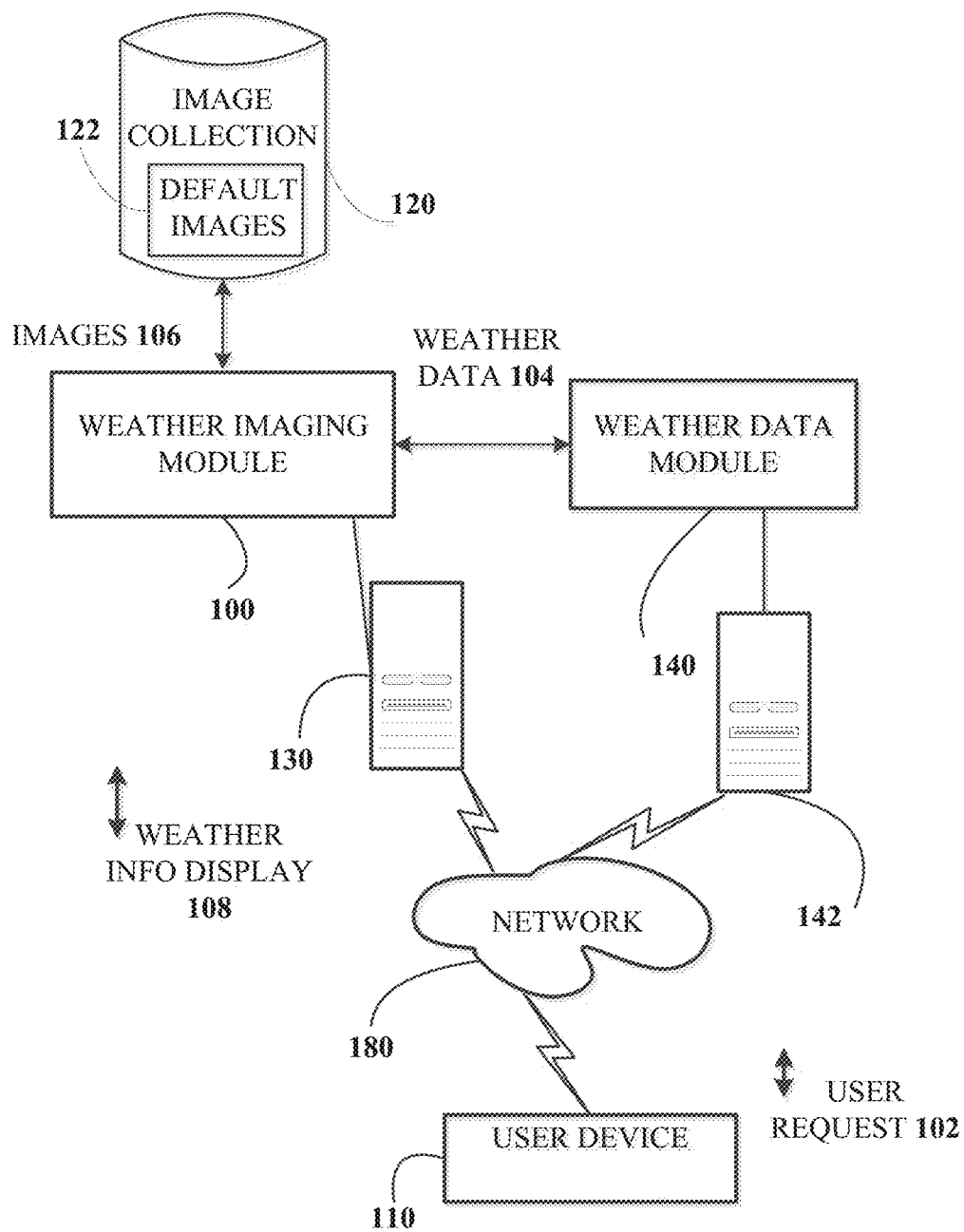
FIG. 1 illustrates a schematic diagram of a weather imaging module that provides weather information in accordance with embodiments described herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Checking the weather is a part of the daily routine for many people. The availability of the Internet and data-enabled computing/mobile devices facilitate users to look up the weather data as often as they desire and thereby receive real-time weather updates not only for their locations but also for far flung regions of the globe. The real-time updates allow a user to better plan his/her day by scheduling outdoors activities at times when the weather is conducive. For many people the weather is also a topic of conversation with friends, family or even strangers. Weather data on computing devices is generally presented as static text data, charts or it may be combined with animated images that fail to illustrate the beauty of nature under the various weather conditions.

Systems and methods described herein facilitate serving users with not only the weather data of their locations of interest but displaying the weather data in combination with appropriate images. In an embodiment, the weather data of a location is displayed with images associated with that location and depicting the weather conditions as indicated by the weather data. By the way of illustration and not limitation, if the weather data of San Francisco indicates a sunny, pleasant day, such data can be shown as an overlay on a photographic image of the Golden Gate Bridge which was captured on a sunny day as indicated by the weather data. Similarly, if the weather data of New York City indicates rainy conditions, such data can be displayed as an overlay on a photographic image of the Empire State Building or other location associated with New York City taken during cloudy/stormy weather conditions as indicated by the weather data. In an embodiment, the images can also match the time of the day associated with the weather data. A display of the weather data in accordance with embodiments described herein therefore provides a user with a window to his/her places of interest. User interaction with various elements of the weather data can lead to presentation of further details as will be described further infra.

Turning now to the figures, FIG. 1 illustrates a schematic diagram of a weather imaging module 100 that provides weather information in accordance with embodiments described herein. A client device 110 is employed by a user to request weather information regarding one or more locations of interest. The user's request 102 is transmitted from the client device 110 via a communication network such as the Internet or cellular network 180 to a server 130 executing the weather imaging module 100. The weather imaging module 100 receives the user request 102 and identifies one or more locations of interest to the user submitting the request 102. In an embodiment, the locations of interest can include as a default value, the user's current location, identified for example, via GPS (Global Positioning System) or IP (Internet Protocol) address data associated with the user request 102. In an embodiment, the locations of interest can additionally include other locations that the user explicitly selects to receive weather data from a list of locations presented by the weather imaging module 100.

The weather imaging module 100 additionally retrieves weather data 104 for each of the locations of interest. In an embodiment, the weather data can be obtained from a weather data module 140 comprised on the server 130 that also executes the weather imaging module 100. In an embodiment, the weather data module 140 can be administered by a third party source on a server 142 that is remote to the server 130 and is communicatively coupled to the server 130 via the network 120. Various parameters, such as but not limited to, temperature, pressure, humidity, rainfall/snow data, pollen count, flooding, extreme weather warning and other factors indicative of the outdoor conditions at a location can be provided as weather data 104 of the location. The weather data 104 can also include predictions for the weather conditions over certain predetermine time periods, such as, for the next twenty four hours from the time of receipt of the request 102 for the weather information. In an embodiment, the weather imaging module 100 transmits the locations of interest to the weather data module 140 to retrieve the weather data 104. In an embodiment, the weather data 104 can be provided to the weather imaging module 100 in a predetermined format that can include text, numbers, alphanumeric characters or combinations thereof.

Upon receiving the weather data 104, the weather imaging module 100 identifies weather conditions of each of the locations of interest described by the retrieved weather data 104. In an embodiment, the weather data 104 can include current weather conditions and weather predictions for a predetermined time period for the locations of interest. The weather imaging module 100 is additionally configured to select images 106 of each of the locations of interest depicting their respective current weather conditions as indicated by the weather data 104. The images are selected from a collection of images 120 saved to a processor-readable non-transitory storage medium. In an embodiment, the images can comprise illustrations such as photographs, paintings or other static/animated depictions of various locales during different weather conditions.

In one embodiment, the image collection 120 comprises digital images such as photographs submitted by the users either to the weather imaging module 100 or a third party source administering the image collection 120. For example, the image collection 120 can be associated with a photo sharing website such as FLICKR. The weather imaging module 100 can solicit users to submit images of locations around the globe depicting a variety of weather conditions that are experienced at different places. In an embodiment, the weather imaging module 100 can establish submission criteria for the user-generated images in order to be considered for induction into the image collection 120. The criteria may comprise but are not limited to specifications regarding quality and subject of the images, image orientation, image size and resolution. In an embodiment, the users can also be required to supply tagging information such as a weather condition depicted in the photograph and geotag their digital images to specify the locations, for example, the city where the image was taken. This facilitates the weather imaging module 100 to identify the various images associated with each of the locations of interest and filter them to select those images that accurately depict the weather conditions as indicated in the weather data 104. It may be appreciated that the image collection 120 is shown as part of the server 130 only by the way of illustration and that the image collection 120 can be stored on a separate third-party server coupled communicatively to the server 130 via the network 120 in accordance with one embodiment.

The weather data 104 is combined with the selected images 106 and configured as a weather information display 108 for presentation to the user on the user device 110. In an embodiment, the combining of the image with the weather data can occur at the weather module 100 and a complete display can be transmitted to the user device 110. In an embodiment, the image collection 120 can be hosted by a third party image server (not shown) and the weather module 100 can provide the user device 110 with metadata to the best available copies of the selected images 106 so that the user device 110 is enabled to request the images directly from the third party server and configure the weather display in accordance with embodiments described herein. For example, the best available copy can be a copy of an image with the highest resolution. The user device 110 can asynchronously download the images from the third party website. In an embodiment, the user device 110 can cache a received image and if the same metadata is received from the weather module 100 in a subsequent connection, the image can be loaded from the local cache instead of connecting to the third party server.

Various formats can be employed for configuring the display of the weather data 104 with the selected images 106. In one embodiment, the display of the weather data 104 of one of the locations is configured as a transparent overlay on a selected image for the location. A plurality of such screens can be configured such that each screen corresponds to one of the user's selected locations of interest. The screens can be presented to the user as a slide show that transitions from one screen to another either automatically or in response to a user action received via a click of a mouse, a tap, a tilt or other modality. The user interface screens can also be configured to be interactive such that a variety of user actions result in retrieval of different information. By the way of illustration and not limitation, selecting a temperature parameter from the weather data 104 can present further details such as maximum, minimum temperatures for a given time period or selecting one of the images 106 can give options to the users to share or save the selected image or selecting a link on the weather data can provide detailed predictions for a predetermined time period.

In an embodiment, the weather imaging module 100 is further configured to expand the search of images associated with the locations of interest if an image that matches the current weather conditions is not found in the image collection 120 for one of the locations. For example, if an image that accurately illustrates the weather conditions at a city included in the locations of interest cannot be identified in the image collection 120, the weather imaging module 100 can modify the definition of the city to cover the county in which the city is located. This facilitates searching over a larger image pool in order to identify a matching image. The search can be gradually expanded to include larger areas so that more images are available for selection. However, it can be appreciated that the search can be expanded only until a certain threshold area for maintaining accuracy of the locations/landmarks pictured in the images. In an embodiment, the image collection 120 can have a generic subset of images 122 that show weather conditions in different places without any location-specific landmarks. By the way of illustration and not limitation, images in the default image collection 122 depicting generic themes can include images of clouds in the sky, a close up image of flowers with dew or an image of an ocean/beach, a full moon or other images which can be found at many geographic locations around the globe. Alternately, the default image collection 122 comprises images such that the location at which they were taken cannot be identified from the image. If no images can be found to accurately depict the weather conditions of a given location even upon expansion, one of the subset of default/generic images 122 that aptly depicts the weather conditions for one of the locations of interest can be combined with the respective weather data 104 for generation of the weather information display 108.

Figure 2:
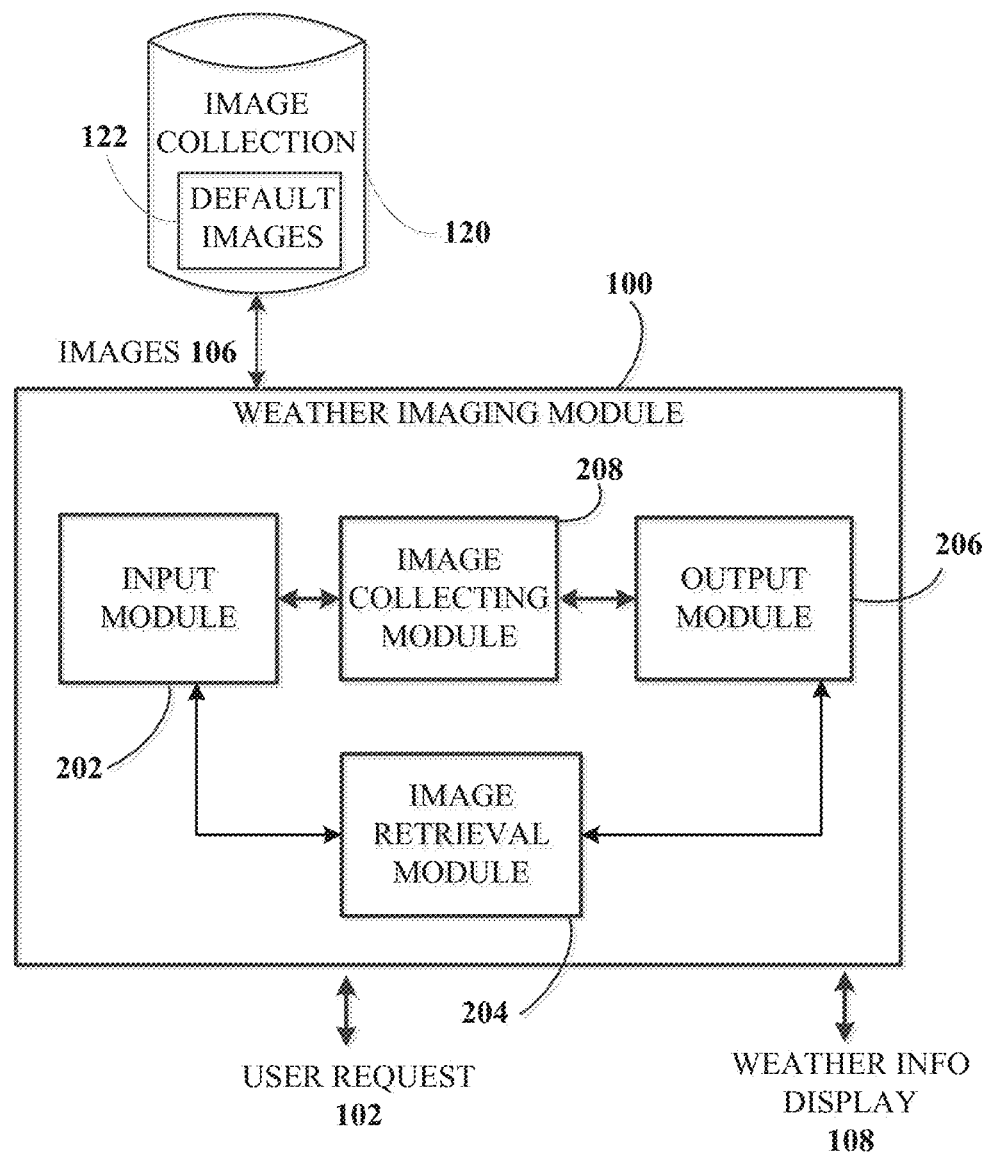
FIG. 2 is a schematic diagram showing the details of the weather imaging module in accordance with one embodiment.

FIG. 2 is a schematic diagram showing the details of the weather imaging module 100 in accordance with one embodiment. The weather imaging module 100 comprises an input module 202 configured to receive user request 102 and transmit it to the image retrieval module 204. The image retrieval module 204 is configured to identify the locations associated with the user request 102 and retrieve the weather data 104 of the identified locations. The retrieved weather data 104 is analyzed to determine the weather conditions of the identified locations and the images of the locations that depict the weather conditions are selected or identified by the image retrieval module 204. The selected images 106 or metadata of the selected images is transmitted to the output module 206 for transmission to user devices in accordance with various formats as detailed herein. The weather imaging module 202 also comprises the image collecting module 208 which is configured to receive user images, verify if the images are in accordance with a predetermined policy established by an entity administering the weather imaging module 100 and save compliant images to the image collection 120. In an embodiment, the image collecting module 208 can be configured to automatically discard or delete images that are not in compliance with the established policy. The image collecting module 208 can be further configured to send via the output module 206, a message regarding the image deletion and a reason for the non-compliance to the users submitting the non-compliant images in accordance with one embodiment.

Figure 3:
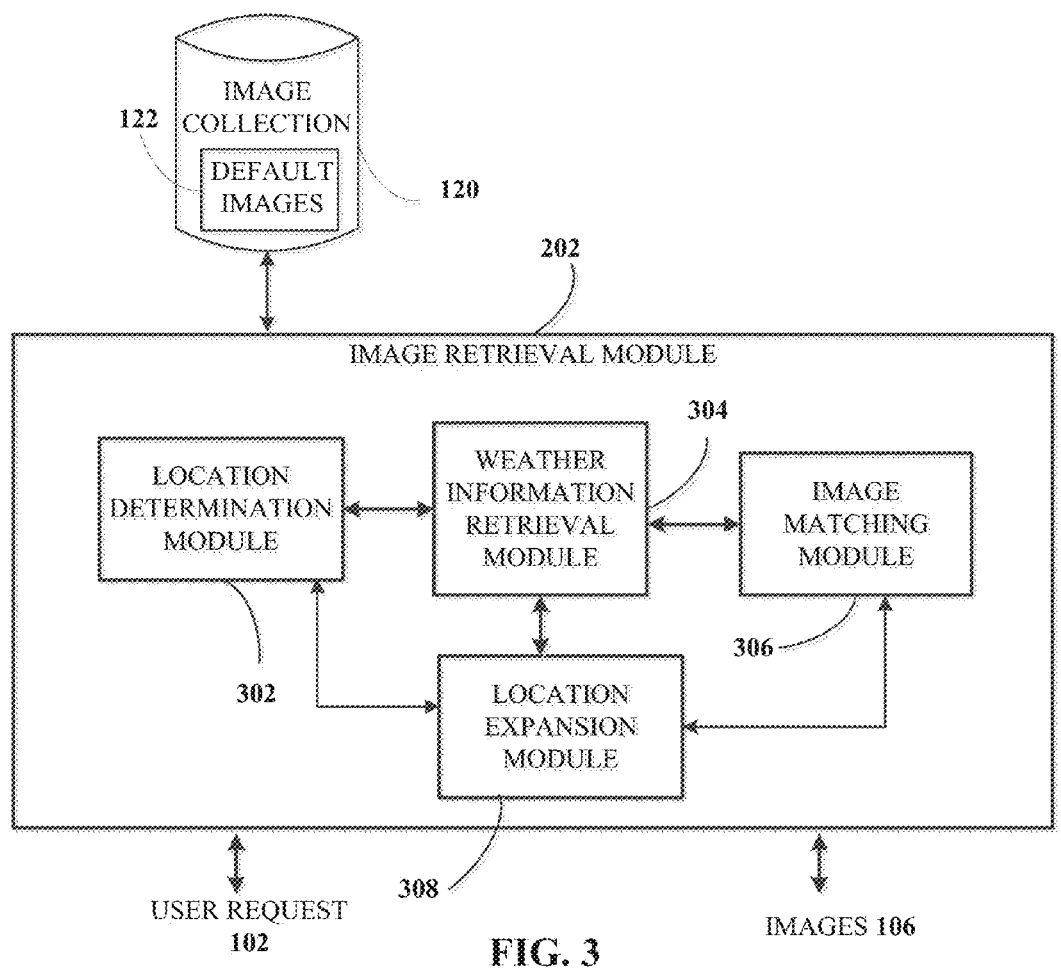
FIG. 3 is a schematic diagram showing details of the image retrieval module in accordance with one embodiment.

FIG. 3 is a schematic diagram showing details of the image retrieval module 204 in accordance with one embodiment. The image retrieval module 204 comprises a location identifier module 302 to analyze the user request 102 and identify locations of interest associated with the user request 102. In an embodiment, the locations of interest can include the user's current location as a default value. Based at least on the type of user device 110 employed to make the request 102, a user's current location can be derived by the location identification module 302 from the GPS data or IP address data associated with the user request 102. In an embodiment, the location identification module 302 can additionally retrieve locations of interest that were explicitly selected by the user and stored in a processor-executable medium associated with the server 130.

The information regarding the identified locations of interest is communicated to the weather information retrieval module 304 that is configured to communicate with the weather data module 140 to receive the weather data 104. In an embodiment, the weather information retrieval module 304 can be configured to communicate the information regarding the locations of interest in a predefined format for retrieval of the weather data 104. In an embodiment, the weather data 104 can comprise various parameters describing the physical conditions at the geographical locations specified by the locations of interest.

The weather data 104 retrieved from the weather module 140 is conveyed to the image matching module 306 which is configured to select images of each of the locations of interest as detailed in accordance with various embodiments. The image matching module 306 is configured to match the received weather data 104 with the tag information of the various images associated with each of the locations of interest. In an embodiment, the weather data 104 can be received in a predetermined format which can include specific predetermined terms to describe various weather conditions. By the way of illustration and not limitation, the received weather data 104 can comprise text input describing the weather conditions as, "sunny", "cloudy", "rainy", "windy", "hot", "humid", "cold" or other adjectives. Similar adjectives can be suggested as tags to the users submitting their images to the image collection 120. The image matching module 306 can be configured to match the text input from the weather data 104 with the tags for images associated with each of the locations of interest and select an image having tagging information that match the weather data 104 for each of the locations.

In an embodiment, each of the locations of interest can be initially defined to cover a certain geographical region which can include by the way of illustration, a village, a city or other unit of geographical region. The images submitted to the image collection 120 can be categorized into various buckets associated with the units of geographical regions based on their geotags. In an embodiment, if no images matching a weather condition can be retrieved for a particular one of the locations of interest, the image matching module 306 can be configured to transmit the information regarding such a location to the location expansion module 308. The location expansion module 308 can be configured to expand the area associated with the location to cover a larger surrounding geographical region. The location expansion module 308 is configured to change or upgrade the unit of geographic region associated with the location to a next unit of the geographical region in a geo-hierarchy. For example, a geographic region can be partitioned into subdivisions in a hierarchical manner such as a city, a county and a state based on natural, political or administrative boundaries. Therefore, if a search of images associated with a location defined as a city fails to retrieve any matches, the unit associated with the location can be upgraded to a next unit, such as a district or county in which the city may be located. The information regarding the expanded geographical region can be transmitted from the location expansion module 308 to the image retrieval module 306. In an embodiment, the information regarding the expanded geographical region can comprise one or more geotag data or a unique id defined within a geo-hierarchy that the image retrieval module 306 can employ for identifying matching images. Thus, the image retrieval module 306 can be configured to locate images having geotags associated with the different cities in the district or county specified by the geotag data from the location expansion module 308 thereby expanding the subset of images from the image collection 120 that are available to match with the weather data 104 for the location. It may be appreciated that different countries around the globe can have their areas divided into different units and the location expansion module 308 can be configured to identify the units of geographic regions based on such regional variations.

When the image retrieval module 306 fails to retrieve images for the expanded geographical region, the information regarding the failure is communicated to the location expansion module 308 in accordance with one embodiment. The location expansion module 308 can be configured to determine if an expansion threshold is reached or if the unit of geographical region can be further expanded. A predetermined expansion threshold is set for the locations associated with the pictures in the image collection 120 in order to maintain accuracy of the location-based image retrieval and to mitigate association of images of places further away with the weather data of the given location. Based on the determination, the location expansion module 308 can either transmit additional information for the identification of images or the location expansion module 308 can signal the image retrieval module 306 that no additional information can be retrieved. The image retrieval module 306 can select images from the default image collection 122 when the geographical region may no longer be expanded.

Figure 4:
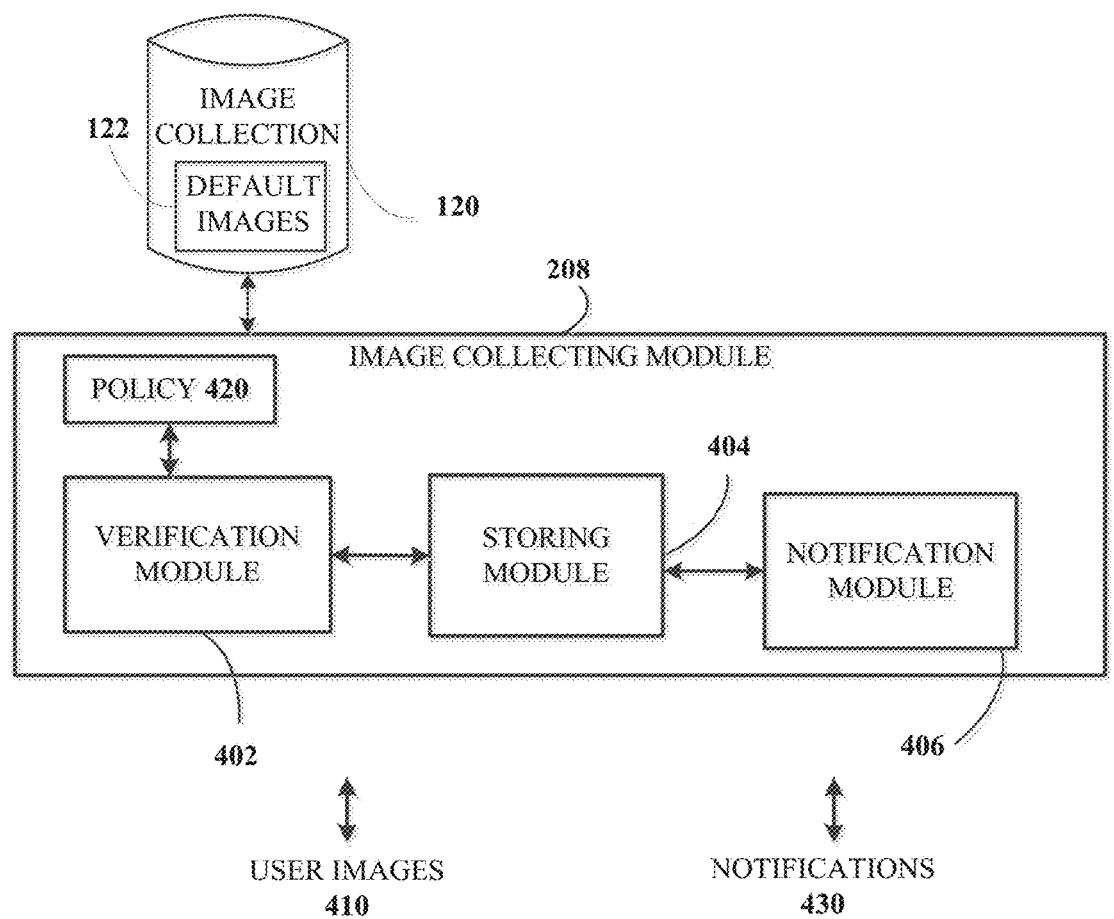
FIG. 4 is a schematic diagram showing details of the image collecting module in accordance with one embodiment.

FIG. 4 is a schematic diagram showing details of the image collecting module 208 in accordance with one embodiment. The images submitted by the users to the weather imaging module 100 are transmitted by the input module 202 to the verification module 402. The verification module 402 checks if each of the user submitted images comply with the policies 420 established for the weather imaging module 100 in accordance with one embodiment. In an embodiment, the verification module 402 can be configured to automatically determine the policy compliance of the user-submitted images 410. In an embodiment, the verification module 402 can be configured to receive additional user input and policy compliance of the user-submitted images can be determined based on a combination of automatic determinations and the user input. By the way of illustration and not limitation, aspects such as association of recommended tag data with the images, image quality, presence of watermarks etc. can be automatically determined whereas confirmations regarding the weather conditions or landmarks are accurately tagged by the users can be obtained via the user input. The images 410 that do not comply with the established policy 420 are identified and the notification module 406 can configure and send appropriate messages or notifications 430 to the users who submitted the non-compliant images. For example, for any missing tag information or images with copyrights the notification module 406 can send messages to the users regarding the reasons for rejection of their images. Those images received from the users that are fully compliant with the established policy 420 are saved by the storing module 404 to the image collection 120 and/or the default collection 122. In an embodiment, the determination on whether an image can be included in the default collection 122 can be made manually by a user such as an administrator or an editor associated with the weather imaging module 100. In an embodiment, the determination to include an image in the default collection 122 can be made by a processor associated with the weather imaging module 100 by via various image analysis algorithms that are currently known or yet to be invented.

Figure 5:
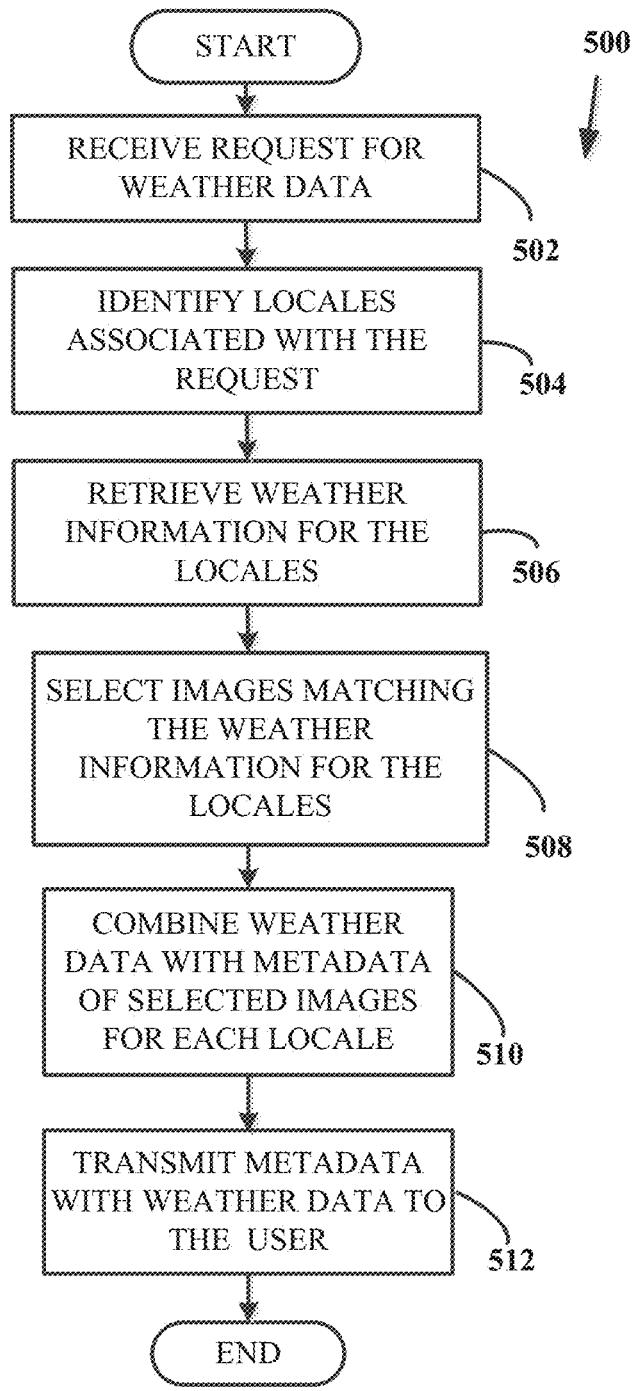
FIG. 5 is a flowchart detailing a method of providing weather information in accordance with embodiments described herein.

FIG. 5 is a flowchart 500 detailing a method of providing weather information in accordance with embodiments described herein. The method begins with the weather imaging module 100 receiving a request for weather data 502. The locales associated with the request are identified 504 in order to retrieve the appropriate weather information. In an embodiment, more than one locale can be associated with the user request. For example, the user can have a profile stored in a processor-readable storage medium and a plurality of locales can be selected by the user to monitor the weather conditions. Accordingly, the plurality of locales are identified at 504 for retrieval of weather data. In an embodiment, a locale can be identified based on the location information transmitted with the request 102. For example, the request 102 can be transmitted by a user device 110 such as a smartphone that is capable of signaling location information such as GPS data or the location information can be retrieved via an IP address employed by the user device 110. Based on the location information associated with the request 102 a locale for retrieval of weather data is to be retrieved can be identified at 504. The weather data 104 indicative of current weather conditions at the identified locales is retrieved at 506 from the weather data module 140. In an embodiment, the retrieved weather data 104 can be communicated in a predetermined format by the weather data module 140 to the weather imaging module 100 in order to enable the weather imaging module 100 to retrieve appropriate images that reflect the weather conditions as indicated in the transmitted weather data 104. At 508 the images associated with each of the identified locales that picture the weather conditions as indicated by the weather data 104 are selected in accordance with embodiments detailed further herein. The metadata of the selected images 106 for each locale is combined with the weather data 104 for the locales at 510 for generating the weather information display 108 and transmitted to the user at 512. The user device 110 can retrieve the selected image using the metadata, configure a display 108 of the selected image with the weather data 104 and provide it to the user. In an embodiment, the selected images 106 can be combined with the weather data 104 at the weather imaging module 100 and the complete display 108 can be transmitted to the user device 110. The weather imaging module 100 therefore serves as a window to the location(s) of interest to the user.

Figure 6A:
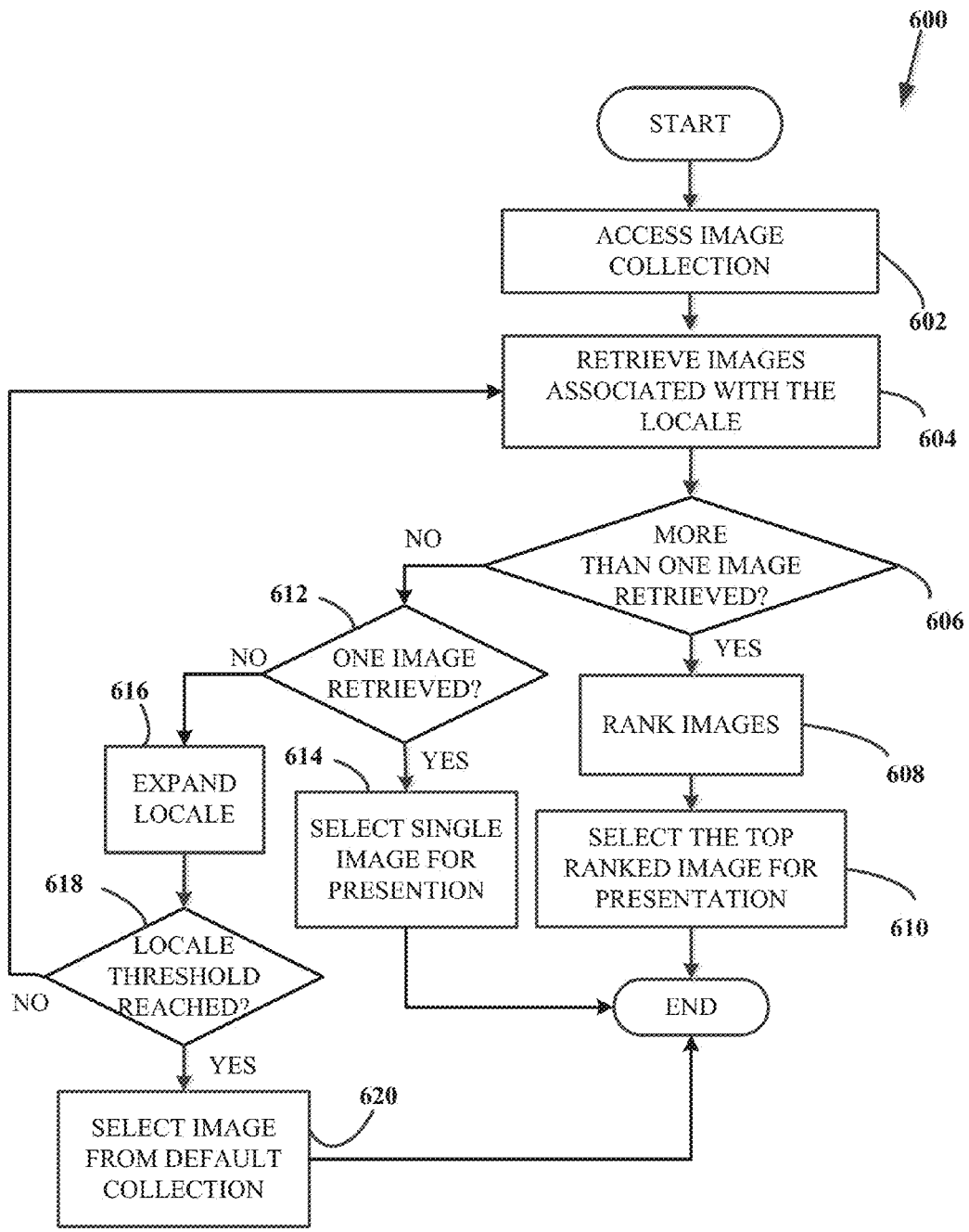
FIG. 6a is a flowchart that details the method of selecting an image associated with a locale which accurately depicts the weather conditions for presentation to the user with the weather data in accordance with one embodiment.

FIG. 6a illustrates a flowchart 600 that details the method of selecting an image associated with a locale which accurately depicts the weather conditions for presentation to the user along with the weather data in accordance with one embodiment. The method of retrieving or selecting appropriate images begins with the weather imaging module 100 accessing the image collection 120 at 602 in order to select images associated with a locale. In an embodiment, the locale can be identified via the location information transmitted with the user request 102 for weather data or it can be selected by the user from a list of locations presented by the weather imaging module 100. In one embodiment, the image collection 120 stores images submitted by the users and associated with geographical identification metadata such as but not limited to, geotags in addition to being tagged with metadata descriptive of the weather conditions depicted in the images. In an embodiment, the images can be stored in a sorted order based on their geographical identification metadata and the weather metadata to facilitate retrieval. At 604, the images associated with the locale that aptly depict the current weather conditions at the locale as indicated in the weather data 104 are retrieved. In an embodiment, the images can include a landmark associated with the locale. In an embodiment, the images may not include a locale-specific landmark but may depict a weather condition at a locale and can be included in the default image collection 122 so that they may be used to depict a weather condition for another locale when the appropriate images cannot be retrieved for the other locale as will be described further infra. It is determined at 606 if more than one location-specific image that aptly depicts the weather data 104 is retrieved. If yes, the images can be ranked automatically by a processor at 608 for example, in a descending order based on various criteria such as but not limited to image quality, association with the locale and depiction of weather condition so that the top ranked image is most closely related to the locale and most aptly depicts the weather conditions. Accordingly, the top ranked image is selected at 610 for presentation to the user with the weather data 104. In an embodiment, the final image for presentation to the user can be selected at 610 by a human editor from the pool of ranked images obtained at 608. In an embodiment, the top ranked image can be associated with a third party image provider and the weather module 100 can provide the user device with a metadata to the best available copy of the top ranked image. For example, the best available copy can be a copy of the image with the highest resolution. The user device 110 can asynchronously download the top ranked image from the third party website. In an embodiment, the user device 110 can cache the image and if the same metadata is received from the weather module 100 in a subsequent connection, the image can be loaded from the cache instead of connecting to the third party website.

If it is determined at 606 that more than one image is not retrieved, it is determined at 612 if exactly one image was retrieved. If yes, the single retrieved image is selected at 614 for presentation to the user with the weather data 104 for the locale and the process terminates on the end block. If it is determined at 612 that even one image was not retrieved for the locale, the locale definition is expanded to cover more geographical area at 616. In one embodiment, each location around the globe is associated with a particular level of geo-hierarchy within the weather imaging module 100 based on natural, political or administrative boundaries. For example, a town or a village can be at the bottom level of the geo-hierarchy whereas a county/district comprising the town can be at a higher level of the geo-hierarchy. A state in which the city is located is at a higher level in the geo-hierarchy while the country including the city will be at a progressively higher level of the geo-hierarchy. Thus, if the locale initially identified with the request 102 is a town, it may be expanded at 616 to cover a county or a district (a next level in the geo-hierarchy) including the town thereby expanding the image pool available for selection. In an embodiment, each of the plurality of locations corresponding to different levels of geo-hierarchy is identified within the weather imaging module 100 via a unique id. For example, a small town can have a first unique id, a county comprising the town may have a second unique id and a state including the county can have yet another third unique id. Thus, the geographic area associated with the locale can be expanded at 616 by replacing the unique id of a geographic entity currently associated with the locale with the unique id of another geographic entity that is higher up in the geo-hierarchy.

It may be appreciated that the locale definition cannot be expanded indefinitely in the interests of maintaining accuracy of the images retrieved for a given locale. For example, the geographical area for a given locale may not be expanded beyond the state associated with the geo-hierarchy of the locale. In an embodiment, standard thresholds can be established for the locales within the weather imaging module 100, for example in terms of geographical area or political subdivisions such as district/county/town/state defined for the locale. Accordingly, at 618, it is determined if the expansion threshold is reached. Alternately, it is determined if the area associated with the locale has expanded beyond the threshold set for the locale. If it is determined at 618 that the threshold has not been reached, the method loops back to 604 for retrieving images associated with the expanded locale and proceeds with the execution of the other steps as detailed supra. If it is determined at 618 that the threshold is reached upon expansion at 616, it is determined that no location-specific images that depict the current weather conditions exist in the image collection 120 and therefore, images that describe the current weather conditions are selected at 620 from the default collection 122 for presentation to the user.

Figure 6B:
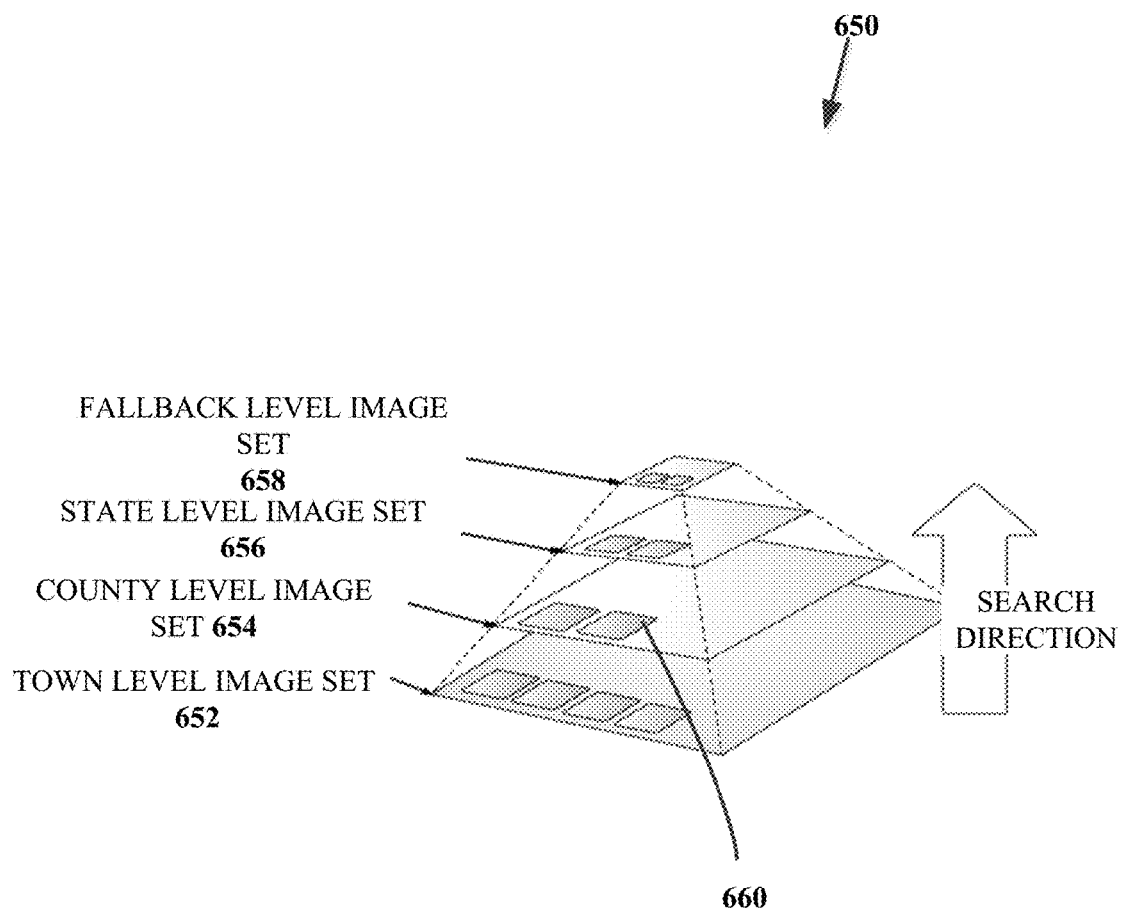
FIG. 6b illustrates a schematic diagram of a geo-hierarchy in accordance with one embodiment.

FIG. 6*b* illustrates a schematic diagram of a geo-hierarchy 650 implemented by the weather imaging module 100 within the image set 120 in accordance with one embodiment. Each level of the geo hierarchy 650 is associated with an image pool/set available to the weather imaging module 100 for image retrieval. The images in the image collection 120 are classified based on their association with the geographical entities/levels such as but not limited to town level image set 652, county level image set 654, state level image set 656 or the fallback/default level 658 in the geo-hierarchy 650. In an embodiment, an image can belong to more than one level and is tagged with a unique id indicative of the different levels to which it may belong. For example, image 660 can be tagged with a unique id indicative of its association with the county level 654 and the town level 652. The tagged image 660 can therefore be preferably retrieved for various searches associated with the county level 654 and optionally for the lower town level 652. When the image matching module 306 fails to select a matching image for a locale from the town level 652, the image 660 can be retrieved from the county level 654 by searching up the geo-hierarch 650 if it depicts the weather conditions that matches the current weather data for a town in the county represented by the county level image set 654.

The locale expansion module 308 alters the unique id associated with the town to another unique id associated with the county level 654 in the geo-hierarchy in order to expand the image pool. In an embodiment, the hierarchy 650 can go up to the state level 656 prior to reaching the threshold. When no matching image can be retrieved even at the state level 656, an image from the default image pool or the fallback level image set 658 which is the top layer of the geo hierarchy 650 is retrieved for presentation to the user. In an embodiment, images depicting the various weather conditions which do not include any location specific landmarks can be tagged with the unique id associated with the default level 658. It may be appreciated that the various levels are shown herein only by the way of illustration and not limitation and that other levels can be defined based on regional variations in referring to geographic entities across the globe. It may be further appreciated that the threshold level is set at the state level 656 only by the way of illustration and that the threshold level can be increased to the country level (not shown) or reduced further to a county level 656 based on the desired granularity of geographical entities defined within the weather imaging module 100.

Figure 6C:
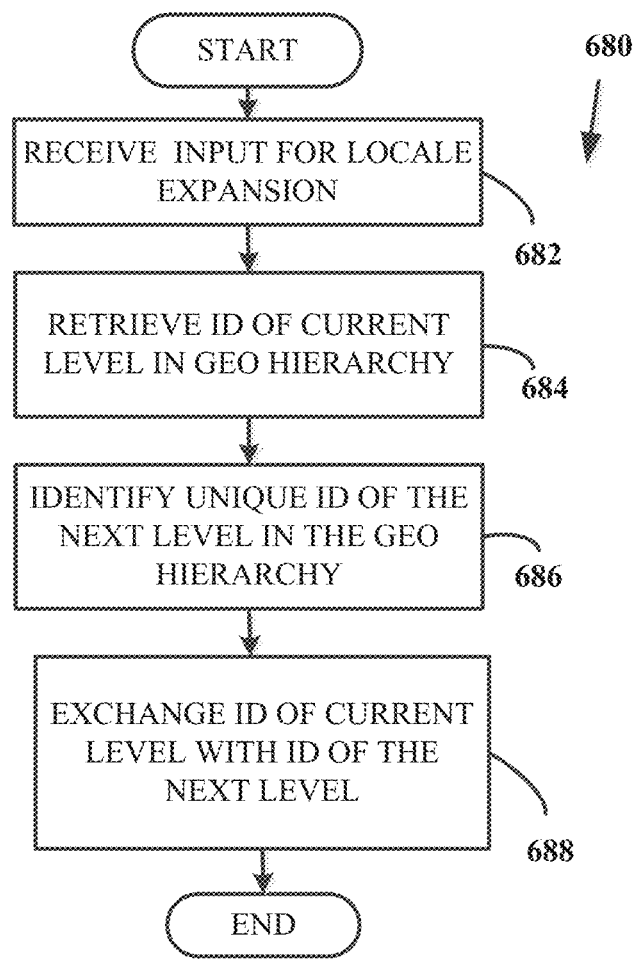
FIG. 6c is a flow chart that details a method for expanding a locale in accordance with one embodiment.

FIG. 6*c* is a flow chart 680 that details a method for expanding a locale as implemented by the location expansion module 308 in accordance with one embodiment. The method begins with the location expansion module 380 receiving an input at 682 to expand the locale definition associated with the search for images in the image collection 120 in accordance with the embodiments described herein. The unique id from the geo hierarchy 650 that is currently associated with the locale associated with the user request 102 is retrieved at 684. At 686 the unique id associated with the next level in the geo hierarchy is identified and the currently associated unique id is exchanged with the unique id associated with the next level in the geo hierarchy 650 at 688 thereby expanding the image pool available for the search.

Figure 7A:
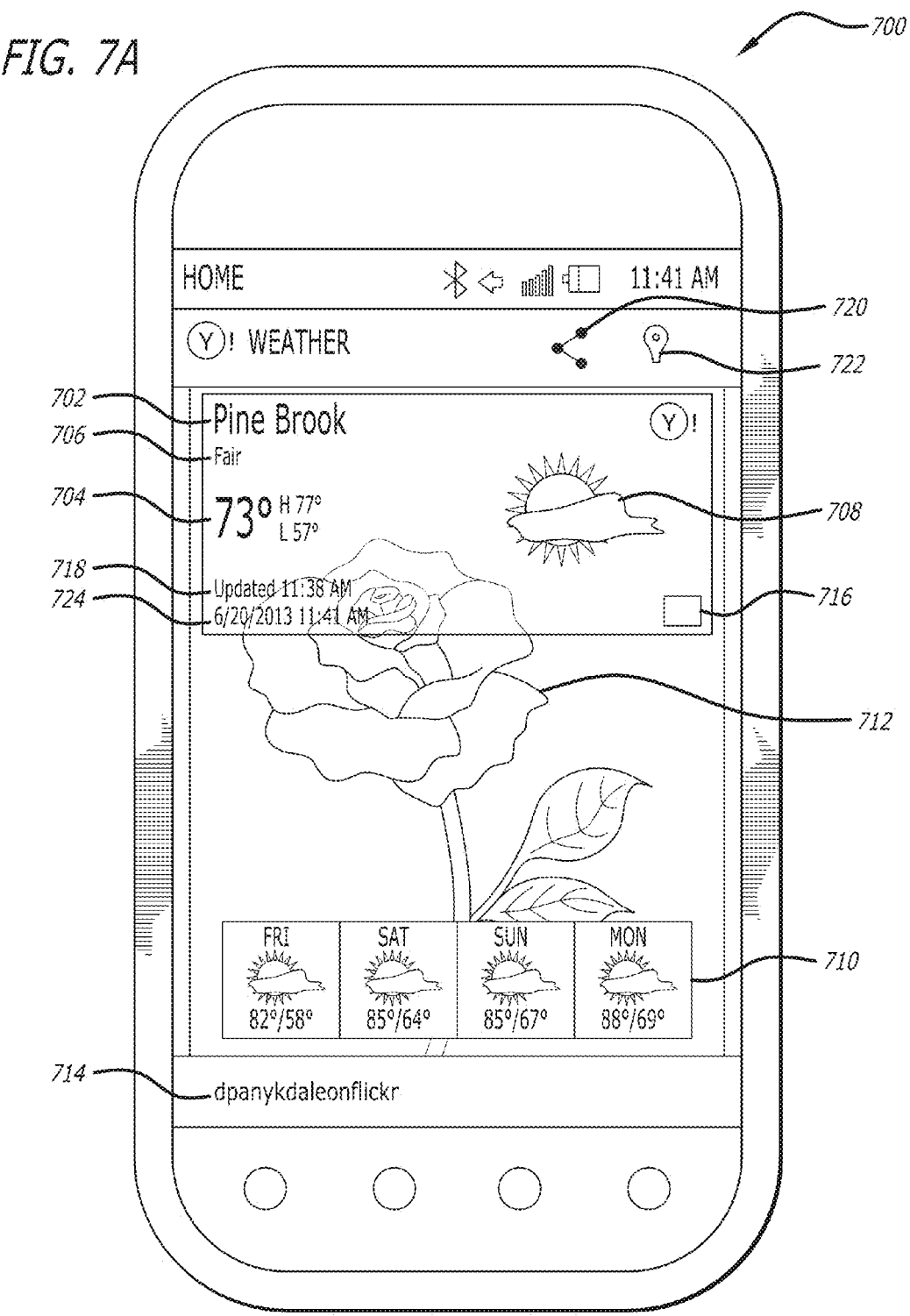
FIG. 7a is a schematic diagram of a user interface showing weather data with a user submitted image in accordance with embodiments described herein.

FIG. 7a is a schematic diagram of a user interface 700 showing weather data with a user submitted image in accordance with embodiments described herein. It may be appreciated that the details described herein are only by the way of illustration and not limitation and that other variations of weather data presentation with user submitted images are possible. The user interface 700 shows weather data superimposed on a user-submitted image 712. It may be noted that the user-submitted image 712 of a flower shown in the user interface 700 is an example of an image from the default image collection 122 indicative that a location-specific image could not be retrieved. It may be noted that the image 712 was updated at 11.38 AM as shown at 718. The user interface 700 also identifies the locale 702 "Pine Brook" and local time 724 at which the weather data 104 was presented to the user. The information presented to the user comprises the temperature 704 including the maximum and minimum temperatures, a textual description 706 "fair" and an image 708 indicative of the current weather conditions at Pine Brook. A list 710 of predicted weather conditions for the next few days is also superimposed on the image 712. The user interface 700 also shows the information of the user 714 submitting the image 712 and the source 716 of the weather data 104. Widgets 720 for sharing the display 700 with the social network and 722 to edit the location information are also included in the user interface 700. Other widgets such as but not limited to, a widget that facilitates retrieval of additional weather data or downloading of the image 712 to a user device can also be included on the user interface 700. Selection of one of the widgets 720 or 722 can lead the user to other user interfaces that facilitate execution of the tasks associated therewith. In an embodiment, the user interface 700 is responsive to further user input. For example tapping on the image 712 can show further details of the image 712 or information related to a landmark that may be depicted in the image 712. In an embodiment, if multiple locations are selected by a user for monitoring the weather conditions, the displays associated with each location can be shown on multiple screens and navigation from one screen to another is facilitated for example, via a slide gesture.

Figure 7B:
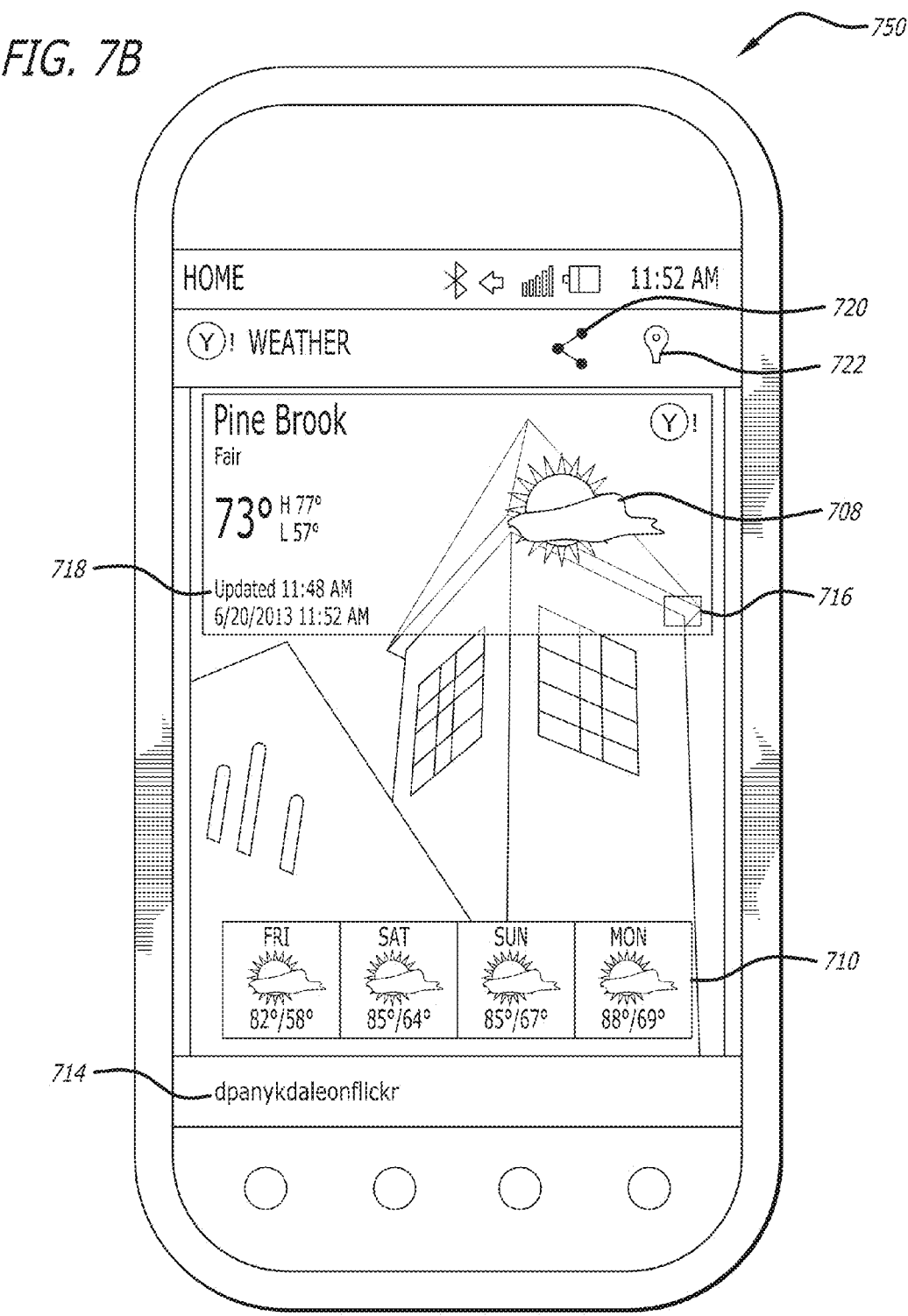
FIG. 7b is a schematic diagram of another user interface shown when the display was refreshed a few minutes after the user interface was retrieved in accordance with one embodiment.

FIG. 7b is a schematic diagram of another user interface 750 shown when the display was refreshed a few minutes after the user interface 700 was retrieved in accordance with one embodiment. The user interface 750 is associated with the same locale "Pine Brook", as the user interface 700 and shows similar weather conditions as the user interface 700. However, it may be noted that the user interface 750 was updated at 11.48 AM as shown at 718 and at that time an image specific to Pine Brook of a local landmark was retrieved and displayed with the weather information. In particular, the city of Pine Brook is situated in Morris County and an image of a church bell tower from a nearby city of Morristown was retrieved and presented at a later time instead of the generic image shown in the user interface 700. Thus, expansion of the geographic area associated with the initial locale of Pine Brook by the location expansion module 308 to include nearby towns from Morris County enabled the weather imaging module 100 to present a location-specific image with the weather information thereby providing a window to Pine Brook (and surrounding areas) to interested users.

Figure 8:
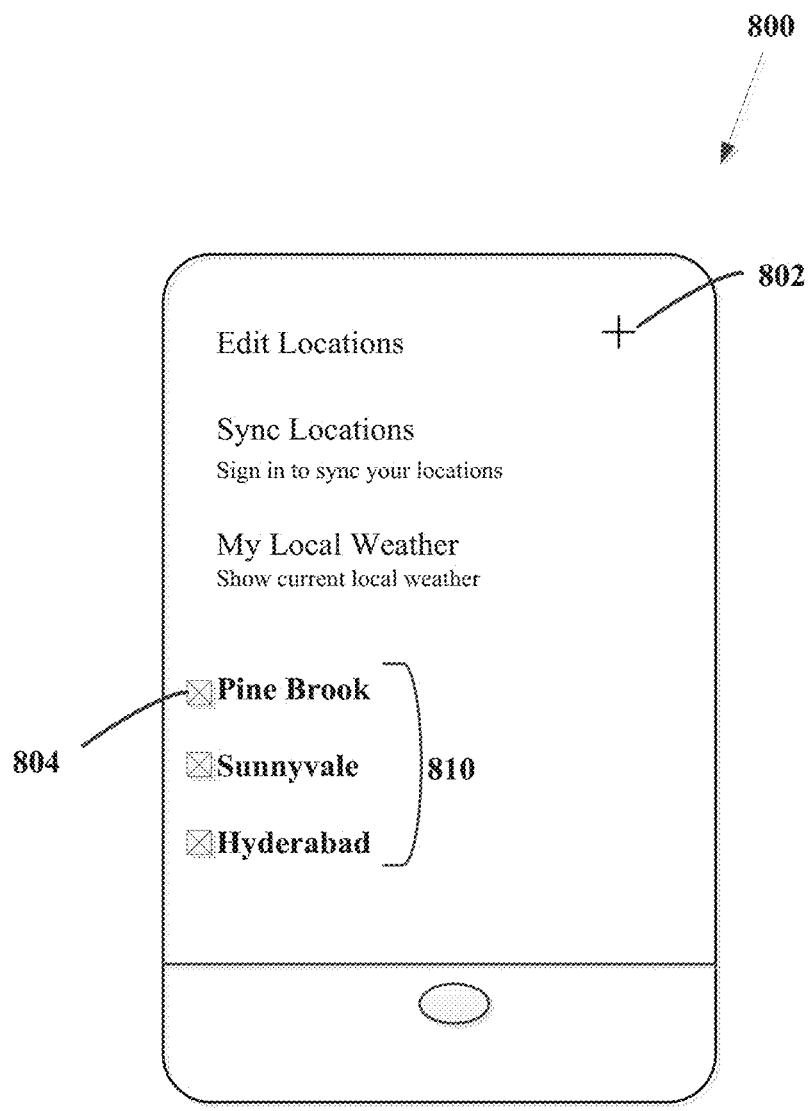
FIG. 8 is an illustration of a user interface that is shown when one of the widget is selected in accordance with one embodiment.

FIG. 8 is an illustration of a user interface 800 that is shown when a widget 722 is selected in accordance with one embodiment. The user interface 800 shows a list of the locations 810 selected by a user for monitoring the weather conditions. As seen from the user interface 800 the weather conditions for various locations across the globe can be monitored. The user interface 800 allows the user to sync the locations from a social network or other user profiles accessible to the weather imaging module 100. Further user interface elements 802, 804 are also included that facilitate respectively adding more locations or deleting existing locations from the user profile.

Figure 9:
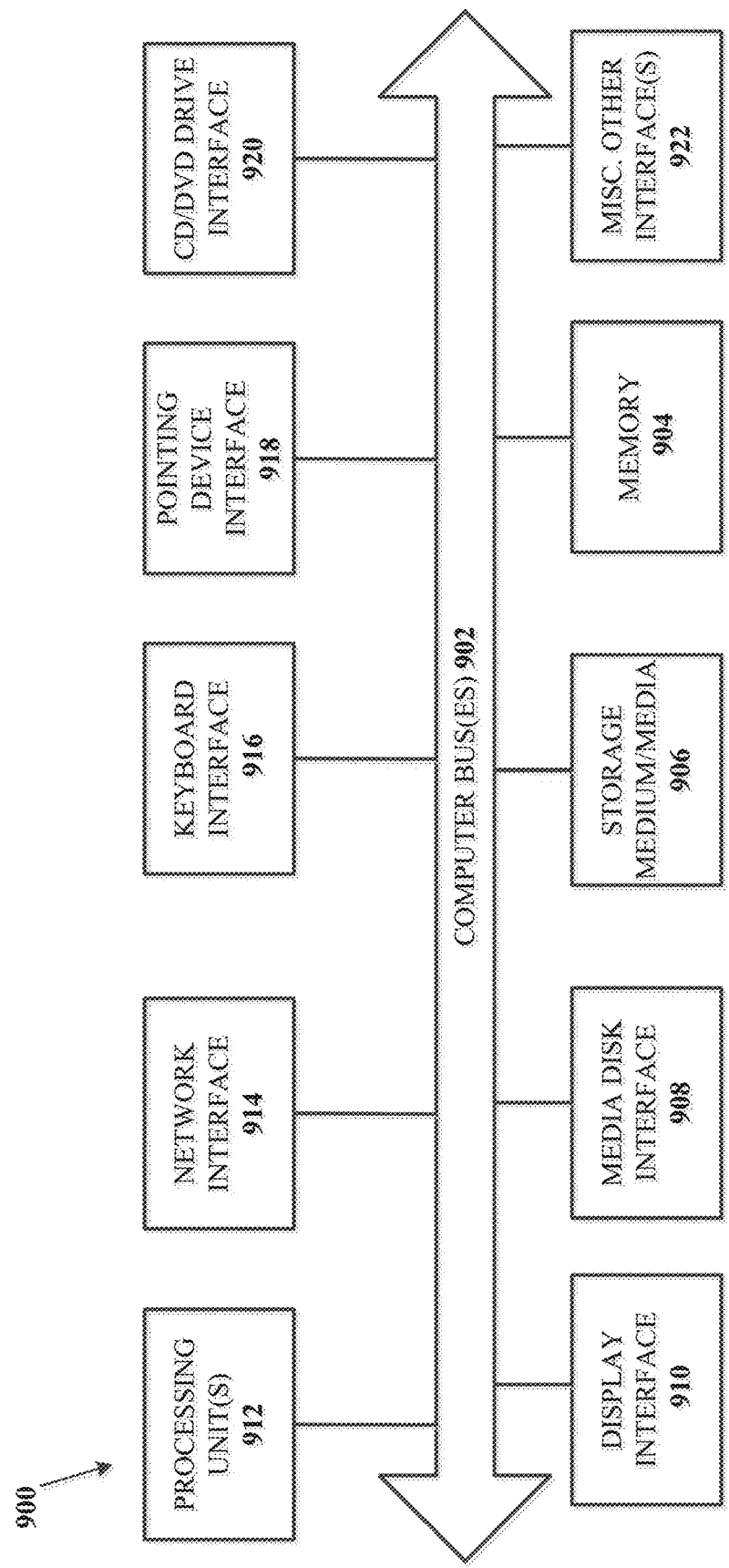
FIG. 9 illustrates internal architecture of a computing device in accordance with embodiments described herein.

As shown in the example of FIG. 9, internal architecture of a computing device 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908, an interface 920 for a drive that can read and/or write to media including removable media such as floppy, CD-ROM, DVD, etc., media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code or logic, and/or computer-executable process steps, incorporating functionality described herein, e.g., one or more of process flows described herein. CPU 912 first loads computer-executable process steps or logic from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules and data files used to implement one or more embodiments of the present disclosure.

FIG. 10 is a schematic diagram illustrating a client device implementation of a computing device in accordance with embodiments of the present disclosure. A client device 1000 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1002, power supply 1028, a memory 1018, ROM 1020, BIOS 1022, network interface(s) 1030, audio interface 1032, display 1034, keypad 1036, illuminator 1038, I/O interface 1040 interconnected via circuitry 1026. Claimed subject matter is intended to cover a wide range of potential variations. For example, the keypad 1036 of a cell phone may include a numeric keypad or a display 1034 of limited functionality, such as a monochrome liquid crystal display (LCD) for displaying text. In contrast, however, as another example, a web-enabled client device 1000 may include one or more physical or virtual keyboards 1036, mass storage, one or more accelerometers, one or more gyroscopes, global positioning system (GPS) 1024 or other location identifying type capability, Haptic interface 1042, or a display with a high degree of functionality, such as a touch-sensitive color 2D or 3D display, for example. The memory 1018 can include Random Access Memory 1004 including an area for data storage 1008.

A client device 1000 may include or may execute a variety of operating systems 1006, including a personal computer operating system, such as a Windows, iOS or Linux, or a mobile operating system, such as iOS, Android, or Windows Mobile, or the like. A client device 1000 may include or may execute a variety of possible applications 1010, such as a client software application 1014 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1000 may also include or execute an application to communicate content, such as, for example, textual content, multimedia content, or the like. A client device 1000 may also include or execute an application 1010 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a computing device over a network, a request for weather information from a user device, the request comprising physical location data associated with a current location of the user device;
   automatically identifying, via the computing device, weather data associated with the current location of the user device in response to said request, said weather data comprising information indicating weather conditions for the current location based on a time said request was received;
   automatically searching, via the computing device, an online image collection for an image that depicts content associated with said identified weather data at said current location of the user device, said search comprising searching said collection using said weather data and said physical location data as a query;
   identifying, via the computing device based on said search, metadata of said image, said metadata comprising information associated with a best available quality version of the image within said collection;
   creating, via the computing device, a weather information display based on said identified weather data and said metadata of said image, said creation comprising automatically retrieving said best available quality version of the image from said collection and combining said retrieved image with said weather data, said created weather information display comprising said weather data transparently overlaid the retrieved image; and automatically communicating, via the computing device over the network, said created weather information display for display on a display of said user device in response to said request.

2. The method of claim 1, wherein said automatic searching further comprises:
searching the online image collection for a set of images that depict content associated with said identified weather data at said current location of the user device, said search comprising searching said collection using said weather data and said physical location data as a query; and
identifying, based on said search, a set of metadata associated with said set of images, said metadata set comprising information associated with a best available quality version of each image within said set.

3. The method of claim 2, wherein said weather information display is created based on said set of metadata.

4. The method of claim 3, further comprising:
causing said weather information display to scroll through said set of images included in said weather information display, said scrolling comprising said weather data being transparently displayed over each scrolled image.

5. The method of claim 1, wherein said collection is based on a plurality of databases on said network.

6. The method of claim 1, wherein said image collection comprises a plurality of user generated images that have been uploaded to the network.

7. The method of claim 1, wherein the physical location data comprises global positioning data (GPS) data of the user device.

8. The method of claim 1, wherein said current location of said user device is automatically expanded based on a hierarchy of geography associated with said physical location data.

9. A non-transitory computer-readable storage medium tangibly encoded with computer-executable instructions, that when executed by a computing device, perform a method comprising:
receiving, over a network, a request for weather information from a user device, the request comprising physical location data associated with a current location of the user device;
automatically identifying weather data associated with the current location of the user device in response to said request, said weather data comprising information indicating weather conditions for the current location based on a time said request was received;
automatically searching an online image collection for an image that depicts content associated with said identified weather data at said current location of the user device, said search comprising searching said collection using said weather data and said physical location data as a query;
identifying, based on said search, metadata of said image, said metadata comprising information associated with a best available quality version of the image within said collection;
creating a weather information display based on said identified weather data and said metadata of said image, said creation comprising automatically retrieving said best available quality version of the image from said collection and combining said retrieved image with said weather data, said created weather information display comprising said weather data transparently overlaid the retrieved image; and
automatically communicating, over the network, said created weather information display for display on a display of said user device in response to said request.

10. The non-transitory computer-readable storage medium of claim 9, wherein said automatic searching further comprises:
searching the online image collection for a set of images that depict content associated with said identified weather data at said current location of the user device, said search comprising searching said collection using said weather data and said physical location data as a query; and
identifying, based on said search, a set of metadata associated with said set of images, said metadata set comprising information associated with a best available quality version of each image within said set.

11. The non-transitory computer-readable storage medium of claim 10, wherein said weather information display is created based on said set of metadata.

12. The non-transitory computer-readable storage medium of claim 11, further comprising:
causing said weather information display to scroll through said set of images included in said weather information display, said scrolling comprising said weather data being transparently displayed over each scrolled image.

13. The non-transitory computer-readable storage medium of claim 9, wherein said collection is based on a plurality of databases on said network.

14. The non-transitory computer-readable storage medium of claim 9, wherein said image collection comprises a plurality of user generated images that have been uploaded to the network.

15. The non-transitory computer-readable storage medium of claim 9, wherein the physical location data comprises global positioning data (GPS) data of the user device.

16. The non-transitory computer-readable storage medium of claim 9, wherein said current location of said user device is automatically expanded based on a hierarchy of geography associated with said physical location data.

17. A computing device, comprising:
a processor;
a non-transitory computer-readable storage medium for tangibly storing thereon program logic for execution by the processor, the program logic comprising:
logic executed by the processor for receiving, over a network, a request for weather information from a user device, the request comprising physical location data associated with a current location of the user device;
logic executed by the processor for automatically identifying weather data associated with the current location of the user device in response to said request, said weather data comprising information indicating weather conditions for the current location based on a time said request was received;
logic executed by the processor for automatically searching an online image collection for an image that depicts content associated with said identified weather data at said current location of the user device, said search comprising searching said collection using said weather data and said physical location data as a query;

logic executed by the processor for identifying, based on said search, metadata of said image, said metadata comprising information associated with a best available quality version of the image within said collection;

logic executed by the processor for creating a weather information display based on said identified weather data and said metadata of said image, said creation comprising automatically retrieving said best available quality version of the image from said collection and combining said retrieved image with said weather data, said created weather information display comprising said weather data transparently overlaid the retrieved image; and logic executed by the processor for automatically communicating, over the network, said created weather information display for display on a display of said user device in response to said request.

18. The computing device of claim 17, further comprising:

logic executed by the processor for searching the online image collection for a set of images that depict content associated with said identified weather data at said current location of the user device, said search comprising searching said collection using said weather data and said physical location data as a query; and logic executed by the processor for identifying, based on said search, a set of metadata associated with said set of images, said metadata set comprising information associated with a best available quality version of each image within said set, wherein said weather information display is created based on said set of metadata.

19. The computing device of claim 18, further comprising:

logic executed by the processor for causing said weather information display to scroll through said set of images included in said weather information display, said scrolling comprising said weather data being transparently displayed over each scrolled image.

20. The computing device of claim 17, wherein said current location of said user device is automatically expanded based on a hierarchy of geography associated with said physical location data.

* * * * *